(12) United States Patent
Kusano et al.

(10) Patent No.: US 7,344,790 B2
(45) Date of Patent: Mar. 18, 2008

(54) HUMIDIFIED FUEL CELL SYSTEM AND PROCESS FOR WARMING THE SAME

(75) Inventors: Yoshio Kusano, Saitama (JP); Toshikatsu Katagiri, Saitama (JP); Motohiro Suzuki, Saitama (JP); Kenji Nagumo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 704 days.

(21) Appl. No.: 10/714,464

(22) Filed: Nov. 14, 2003

(65) Prior Publication Data

US 2004/0142218 A1 Jul. 22, 2004

(30) Foreign Application Priority Data

Nov. 14, 2002 (JP) ............... 2002-331205

(51) Int. Cl.
*H01M 8/04* (2006.01)
(52) U.S. Cl. .......................... 429/26; 429/34
(58) Field of Classification Search ........ 261/104; 429/17, 26, 34
See application file for complete search history.

(56) References Cited

U.S. PATENT DOCUMENTS

2001/0015501 A1* 8/2001 Katagiri et al. ............ 261/104
2002/0041985 A1* 4/2002 Shimanuki et al. ........... 429/17
2002/0098395 A1 7/2002 Shimanuki et al.
2002/0119356 A1 8/2002 Shimanuki et al.
2002/0160240 A1 10/2002 Matsui et al.

FOREIGN PATENT DOCUMENTS

| JP | 07-071795 | 3/1995 |
|---|---|---|
| JP | 2001-216981 | 8/2001 |
| JP | 2002-66262 | 3/2002 |
| JP | 2002-75419 | 3/2002 |
| JP | 2002-81703 | 3/2002 |
| JP | 2002-117882 | 4/2002 |

* cited by examiner

*Primary Examiner*—Mark Ruthkosky
(74) *Attorney, Agent, or Firm*—Lahive & Cockfield, LLP; Anthony A. Laurentano, Esq.

(57) ABSTRACT

A humidifier for humidifying a fuel cell composed of an anode side humidifier and a cathode side humidifier each possessing a plurality of hollow fiber membrane modules for migrating moisture between a supply gas, which is supplied to a fuel cell, and an exhaust gas, which is exhausted from the fuel cell to thereby humidify the supply gas, the humidifier comprising: a pair of heads which hold both ends of the hollow fiber membrane modules, a connecting member which connects each of heads, and a device for warming the supply gas composed of conduits through which a cooling medium exhausted from the fuel cell is passed. The device for warming the supply gas is configured so that first warms a humidifier at an outlet side of the supply gas, and then warms a humidifier at an inlet side of the supply gas.

5 Claims, 4 Drawing Sheets

HUMIDIFIED FUEL CELL SYSTEM AND PROCESS FOR WARMING THE SAME

BACKGROUND OF THE INVENTION

1. Field of the Invention

The present invention relates to a humidifier for fuel cell utilizing water-permeable type hollow membranes and a process for warming the same.

2. Description of the Related Arts

A fuel cell which is carried on an automobile or such is composed of a lamination of a polymer membrane electrolyte assembly (hereinafter sometimes referred to as "MEA") having an anode and a cathode provided on both surfaces thereof; gas passages each for supplying a reactant gas formed on both surfaces of the MEA; and separators which support MEA from both sides. In order to allow hydrogen ions for easily flowing within MEA, a humidifier is placed, which humidifies hydrogen and oxygen for being supplied within the fuel cell.

In such a fuel cell, a hydrogen gas is supplied to the anode as a fuel supply gas and air containing oxygen is supplied to the cathode as an oxidant gas, whereby a chemical energy generated due to a redox reaction between them is directly taken as an electric energy, which will be supplied to an electric motor to drive the electric motor. Specifically, at the anode side, the hydrogen gas is ionized to migrate the hydrogen ions into MEA, while electrons is migrated into MEA at the cathode to allows the electrons to be reacted with oxygen to produce water. In this series reaction, the electric energy can be taken.

The humidifier of the fuel cell has a plurality of humidification modules, which allow moisture to migrate between the supply gas supplied to the fuel cell and an exhaust gas (off gas) exhausted from the fuel cell to thereby humidify the supply gas, so that both poles, cathode and anode of the fuel, cell can be humidified.

As the prior art, we have suggested a fuel cell system, filed on Jan. 23, 2002 as JP Application No. 2001-13916 corresponding to US Patent Publication No. 2002-0119356A1, description of which is incorporated herein by reference. Referring to FIG. 5, the conventional fuel cell system will be described. FIG. 5 is a drawing which shows the configuration of the conventional fuel cell system 40. As shown in FIG. 5, the conventional fuel cell system 40 is configured so that a fuel cell (hereinafter referred to as "FC") 41 having an air supply system 42, an air exhaust system 43, a hydrogen gas supply system 44, a hydrogen gas exhaust system 45, and a cooling system 46 provided thereon.

FC 41 is a PEM type fuel cell having a configuration in which a plurality of cells, which are units of power generation, are laminated. In this FC 41, the most stable output conditions can be obtained, for example, under a temperature environment ranging from 70 to 80° C. This FC 41 has a circuit configuration that FC 41 supplies power to a battery and a driving unit of a traction motor via a device for controlling output current (not shown).

The air supply system 42 supplies air to cathode of FC 41 at a side of an inlet thereof. From upstream to downstream, the air supply system 42 has a supercharger (S/C) 42A, an intercooler (I/C) 42B, a heat exchanger (H/E) 42C, and a cathode side humidifier 42D as a water-permeable membrane type humidifier provided thereon.

The air exhaust system 43 exhausts a highly wetted exhaust gas containing the produced water from a side of an outlet of cathode of FC 41.

The hydrogen gas supply system 44 supplies a hydrogen gas as the supply gas to the anode of FC 41 at the side of an inlet thereof. For this reason, the hydrogen gas supply system 44 has a hydrogen ($H_2$) tank 44A, a heat exchanger (H/E) 44C, an ejector 44B, and an anode side humidifier 42D as a water-permeable membrane type humidifier provided thereon. Parallel to the anode side humidifier 42D, a water sucking ejector (E/J) 44 is placed inbetween a downstream of H/E 44C and a downstream of the anode side humidifier 44D.

The hydrogen gas exhaust system 45 exhausts a highly wetted anode exhaust gas, which is an excess hydrogen gas in which the produced water is contained, from the anode of FC 41 at a side of its outlet.

The cooling system 46 is configured so as to allows FC 41 to cool down to an appropriate temperature through a cooling medium circulating between FC 41 and heat exchanger 46A.

However, in the conventional fuel cell system, there is a temperature difference between the temperature of the fuel cell (FC) itself and the temperature of the supply gas, which poses a problem that the supply gas cannot supply to FC at a temperature similar to the temperature of FC. Also, in the fuel cell system, there is a large distance from a theoretical thermal efficiency, and thus, further enhancement of thermal efficiency in FC has been required.

An object of the present invention is, therefore, to provide a humidifier for fuel cell, which can enhance heat exchange to thereby warm a humidifier in an appropriate manner and to provide a process for warming such a humidifier.

SUMMARY OF THE INVENTION

According to the present invention, there is provided a humidifier for humidifying a fuel cell composed of an anode side humidifier and a cathode side humidifier each possessing a plurality of hollow fiber membrane modules for migrating moisture between a supply gas, which is supplied to a fuel cell, and an exhaust gas, which is exhausted from the fuel cell to thereby humidify the supply gas, said humidifier comprising:

a pair of heads which hold both ends of said hollow fiber membrane modules, a connecting member which connects each of heads, and a device for warming the supply gas composed of conduits through which a cooling medium exhausted from the fuel cell is passed, wherein said device for warming the supply gas is configured so that first warms a humidifier at an outlet side of the supply gas, and then warms a humidifier at an inlet side of the supply gas.

According to the humidifier of the present invention, which comprises a pair of heads of which hold both ends of hollow fiber membrane modules comprising hollow fiber membranes, a connecting member which connects each of heads, and a device for warming the supply gas (hereinafter referred to as "a hot water riser"), can enhance a humidification efficiency due to heat exchange with a high efficiency and can humidify the supply gas in an appropriate manner.

According to a process for warming a humidifier of the present invention is a process for warming a humidifier for fuel cell comprising an anode side humidifier and a cathode side humidifier each possessing a plurality of hollow fiber membrane modules for migrating moisture between a supply gas, which is supplied to a fuel cell, and an exhaust gas, which is exhausted from the fuel cell to thereby humidify the supply gas, said process comprising a first step for warming the humidifier at an outlet side of the supply gas by a cooling medium just exiting said fuel cell and still remaining hot; and a second step for warming the supply gas at an inlet side by the cooling water after warming the humidifier at the outlet side of the supply gas.

According to the process for warming a humidifier of the present invention, in the process for warming a humidifier having a hot water riser, the outlet side of the supply gas of the cathode side humidifier can be warmed first by a cooling medium, which just exits from the fuel cell and which is warmed. Consequently, the temperature of the supply gas immediately before being supplied to the fuel cell may be substantially the same temperature as that of the fuel cell itself, and then the supply gas having such a temperature can be supplied to the fuel cell. This makes it possible to enhance an electrochemical reaction in which oxygen and hydrogen are reacted to take an electric energy.

Also, since the outlet side of the supply gas of the cathode side humidifier can be warmed first by a cooling medium, which just exits from the fuel cell and which is warmed, the heat is difficult to be radiated. In addition, by warming the inlet side of the supply gas, the heat can be much more effectively utilized. For this reason, the enhancement of heat efficiency leads to enhancement of heat exchange. This can provide a fuel cell having enhanced heat exchange performance.

DESCRIPTION OF THE PREFERRED EMBODIMENTS

Figure 1:
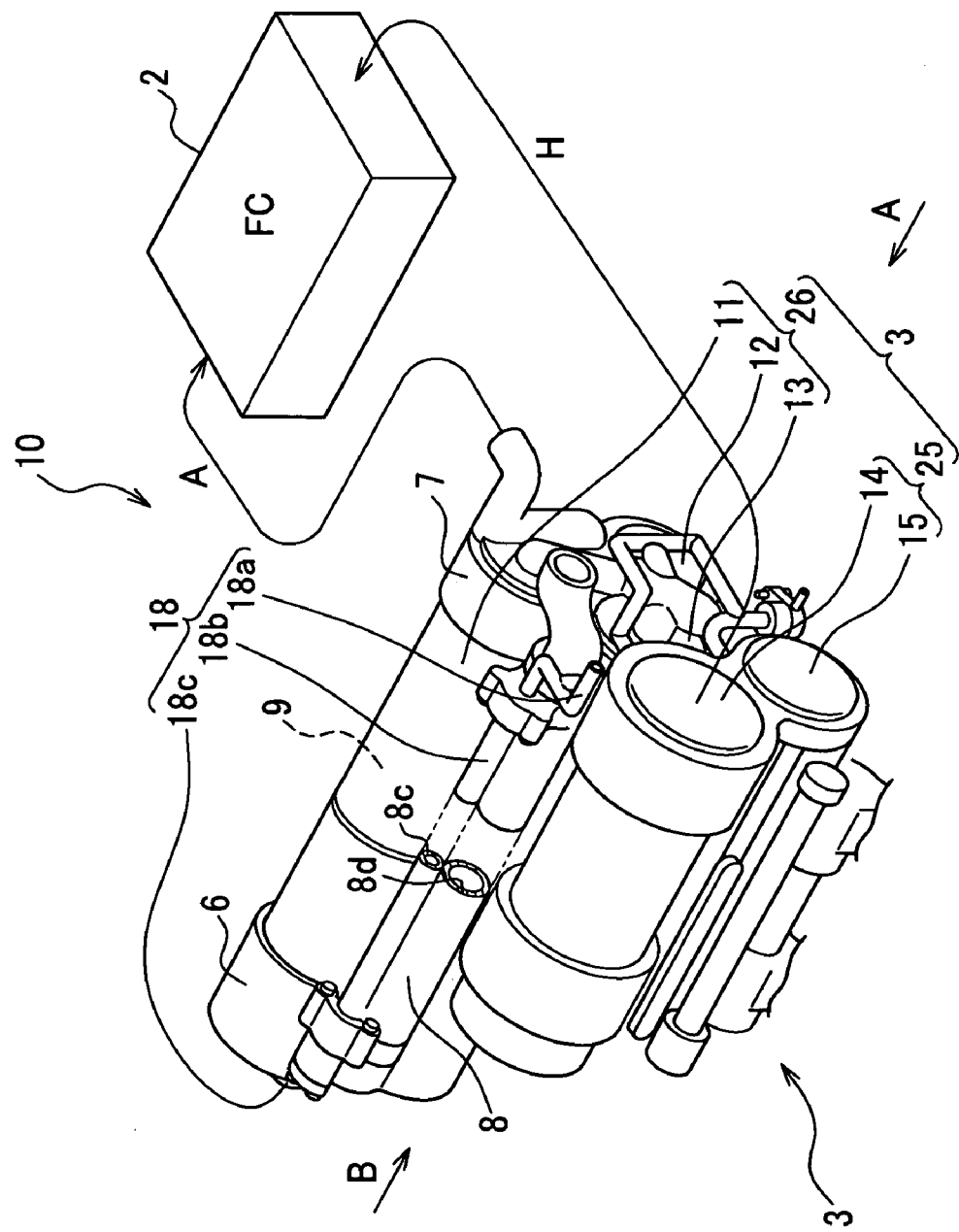
FIG. 1 is a perspective view showing a fuel cell system composed of a fuel cell and a humidifier having a hot water riser.
Figure 2:
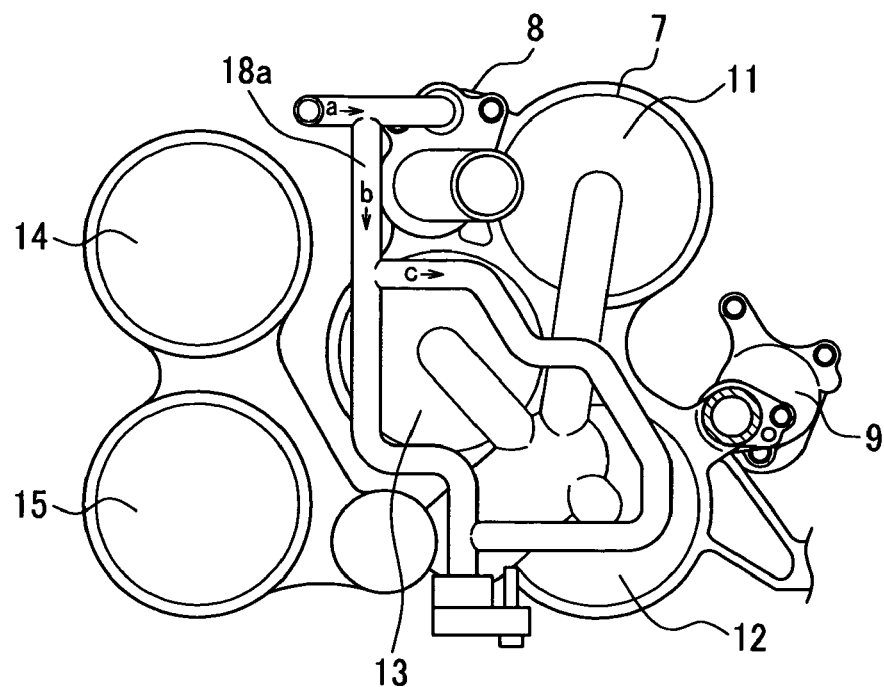
FIG. 2 is a right side view of the humidifier having a hot water riser of FIG. 1 viewing from the arrow A-A.
Figure 3:
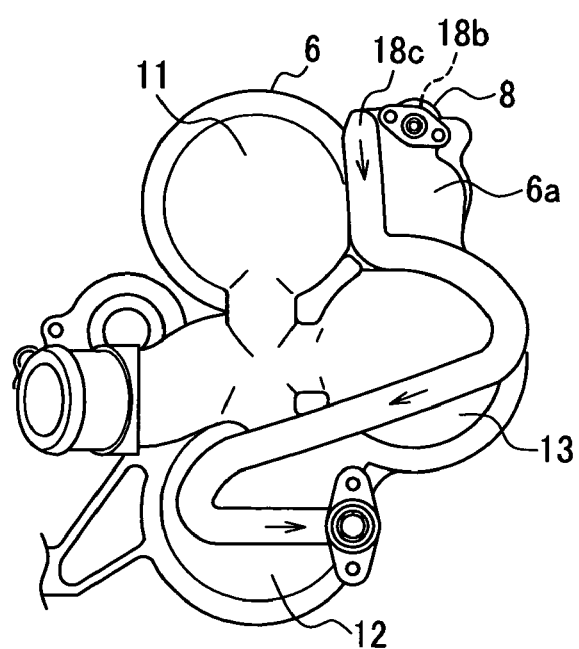
FIG. 3 is a left side view of the humidifier having a hot water riser of FIG. 1 viewing from the arrow B-B.

Referring to FIG. 1 to FIG. 3, one embodiment of the humidifier according to the present invention will now be described. This embodiment is an embodiment that the humidifier of the present invention is applied to a humidifier for a fuel cell which is provided on a fuel cell electric vehicle. FIG. 1 is a perspective view showing a fuel cell system composed of a fuel cell and a humidifier having a hot water riser. As shown in FIG. 1, the fuel cell system 1 is mainly composed of FC (fuel cell) 2, a humidifier 3, to humidify air and hydrogen, which are supply gases, and a capacitor (not shown) to storage electricity.

The term "hot water riser" used herein means a device for warming a supply gas to be supplied to the fuel cell by passing a hot water there-through. Specifically, the hot water riser means a device composed of conduits for transmitting a heat of the cooling medium (cooling water) to the humidifier, preferably as a counter flow against the supply gas to warm the humidifier.

As shown in FIG. 1, the humidifier 3 is a device, which migrates moisture between the supply gas from FC 2 and the exhaust gas (off gas) exhausted from FC 2 to humidify the supply gas whereby both the cathode and the anode are humidified. The cathode side humidifier 26 possesses three hollow fiber membrane modules 11, 12, and 13 comprising hollow fiber membranes. The anode side humidifier 25 posseses two hollow fiber membrane 14 and 15. Both ends of each membrane modules 11, 12, or 13 have left side head 6 (inlet side of the supply gas) and right side head 7 (outlet side of the supply gas) provided thereon. The left side head 6 and the right side head 7 are connected by an upper connecting member 8 and a side connecting member 9 (See FIG. 2).

On the upper connecting member 8 are formed two conduits, i.e., a narrow conduit 8c (having a small diameter), through which a hot water is passed to warm the humidifier 3 according to this embodiment (See FIG. 1) and a conduit 8d having a large diameter as a conduit for the exhaust gas (wet air). Both heads are preferably made of metal, which is of highly heat conductivity.

Also, a conduit (not shown) for the exhaust gas is formed on the side connecting member 9. This conduit has a middle diameter, i.e., larger than that of the narrow conduit 8c and smaller than that of the conduit 8d.

The hot water riser 18 is composed of a pipe around the outer circumference of the right side head 7 and a pipe around the outer circumference of the left side head 6 and is unified with the upper connecting member 8.

FIG. 2 is a right side view of the humidifier having a hot water riser of FIG. 1 viewing from the arrow A-A. As shown in FIG. 1, the hot water riser 18 is composed of conduits 18a, 18b, and 18c.

The conduit 18a making up the hot water riser is provided around the outer circumference of the right side head 7, and the hot water riser 18 first warms the outlet side, which is at the FC side of the cathode side humidifier 26 by utilizing the cooling medium, which is exhausted from FC 2 and remains hot having a temperature of from approximately 70 to 80° C. As for the flow of the cooling medium within a passage "a" as shown by the arrow in FIG. 2, the passage "a" is first branched at an upper portion of the right side head 7 into the passage "a" and a downward passage "b", and the cooling medium flows downwardly as shown in the arrow. Further, the passage "b" is branched into the passage "b" and a passage "c", and the cooling medium flows in a direction as shown in the arrow. As described above, the cathode side humidifier 26 at the outlet side of the supply gas is first warmed so that there is no substantial temperature difference between FC 2 itself and the cathode side humidifier 26 at the outlet side of the supply gas, and the supply gas having been humidified and having a temperature resembling the temperature of FC 2 is supplied to FC 2.

The conduit 18b making up the hot water riser is positioned at an upper portion of the right side head 7, and the cooling medium within the passage "a" flows into the narrow conduit 8c, and is then directed to the opposite left side head 6 of the cathode side humidifier 6.

FIG. 3 is a left side view of the humidifier 3 having a hot water riser of FIG. 1 viewing from the arrow B-B. As shown in FIG. 3, the conduit 18c making up the hot water riser 18 is connected to the conduit 18b of the upper connecting member 8 via a flange portion 6 and is a pipe which is substantially bent into a Z shape or a reverse S shape. The conduit 18c is also piped so as to wind the outer circumference surface of the left side head 6. As described above, the exhaust gas entering in the inlet of the cathode side humidifier 26 is warmed. It is also possible that the piping extends to warm the exhaust hydrogen gas entering in an inlet of the anode side humidifier 25.

Figure 4:
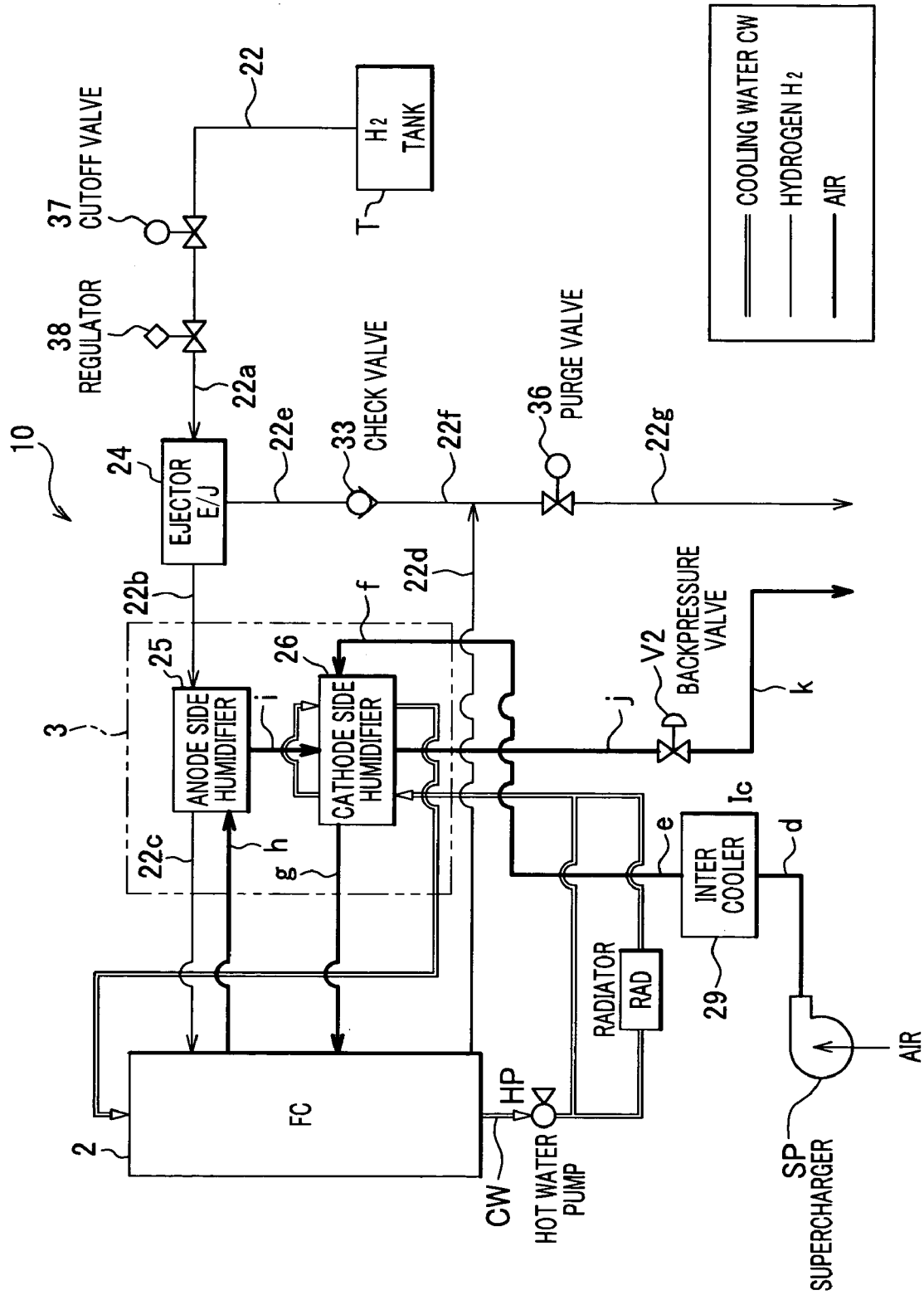
FIG. 4 is a drawing which shows the configuration of the fuel cell system utilizing the humidifier having a hot water riser.
Figure 5:
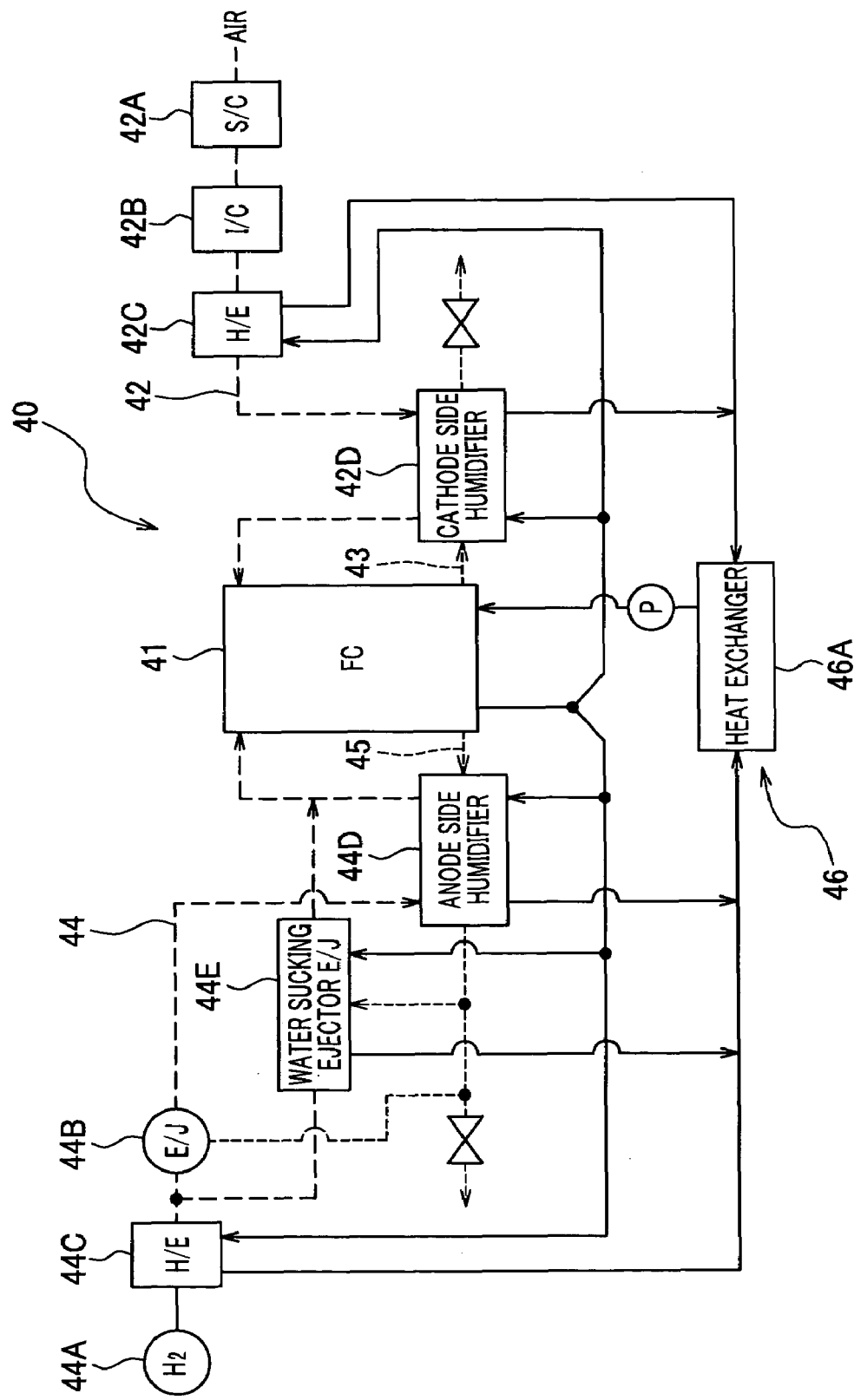
FIG. 5 is a drawing which shows the configuration of the conventional fuel cell system.

FIG. 4 is a drawing which shows the configuration of the fuel cell system utilizing the humidifier having a hot water riser. In FIG. 4, the flow of hydrogen ($H_2$) is shown as a fine line. A hydrogen gas ($H_2$) as a supply gas from a hydrogen storage tank T is passed through a hydrogen supply tube 22, through a cutoff valve 37, a regulator 38, and from a hydrogen supply tube 22b, and an ejector 24 to enter in an anode side humidifier 25, at which the hydrogen is humidified. Thereafter, the humidified hydrogen is passed through a hydrogen supply tube 22c to be supplied to an anode of FC 2.

The hydrogen $H_2$ having been supplied to the anode undergoes a redox reaction, after which part of the hydrogen gas becomes an exhaust hydrogen gas and is exhausted out of FC 2. The exhaust hydrogen gas enters from a hydrogen gas returning tube 22d into a hydrogen exhaust tube 22f. Upon opening a purge valve 36 for exhausting a fluid, the exhaust hydrogen gas is passed there-through and then discharged from a hydrogen exhaust tube 22g to atmosphere.

The returning tube 22d, a check valve 33 and a tube 22e form a circulation passage whereby hydrogen that is unused by the fuel cell can be recycled and passed to the fuel cell 2 via the ejector (E/J) 24. The check valve 33 can prevent the hydrogen from flowing backward. The ejector (E/J) 24 sucks the exhaust hydrogen gas, which is introduced from the exhaust hydrogen gas returning tube 22d through the load generated by the flow of the hydrogen gas, which is supplied from the hydrogen supply tube 22a, and supplies a mixed gas comprising the hydrogen gas and the exhaust hydrogen gas to the anode side humidifier 25.

The route of the air is shown in FIG. 4 as a thick line. Air as an oxidant gas is compressed by supercharger SP, and supplied from an air supply tube d via intercooler 29 and also via air supply tubes e and f to a cathode side humidifier 26, at which the air is humidified. Thereafter, the air is passed through an air supply tube g and is supplied to a cathode of FC 2. Oxygen contained in the air having been supplied to the cathode is consumed as the oxygen gas, the air, which becomes an exhaust gas, is exhausted from an air exhaust tube h. The exhaust gas is then passed through the anode side humidifier 25, flowing through an air exhaust tube i, an anode side humidifier 26, an air exhaust tube j, a backpressure valve V2, and an air exhaust tube k, and is then exhausted to atmosphere.

The flow route of the cooling medium is shown as a double line in FIG. 4. Since FC 2 is under a temperature environment, for example, ranging from 70 to 80° C., the cooling water existing FC 2 has a temperature similar to that of FC 2. The warm of cooling medium is effectively utilized to constitute a hot water riser 18, first which can warm the outlet of the humidifier 3, especially the outlet of the cathode, and then warm the inlet of the cathode. Also, first the outlet of the cathode side humidifier 26 may be warmed, then the outlet of the anode side humidifier 25 may be warmed, and thereafter the inlet of the cathode side humidifier 25 and that of the anode side humidifier 25 may be warmed.

The hot water pump HP selectively supplies the cooling medium CW to a radiator RAD, and then allows the cooling medium CW first for flowing to the outlet of the cathode side humidifier 26, and then for flowing to the cathode side humidifier 26 at the inlet side positioned opposite the outlet whereby the cooling medium CW is returned to FC 2 and circulated.

The supply gas (air) going to FC 2 is much more humidified and, thus, an efficiency for electrochemical reaction is decreased if the temperature is decreased until the supply gas reaches FC 2. Consequently, it is important to warm a cathode side humidifier at the outlet (FC) side by a hot cooling medium just exiting FC 2. Also, since the supply gas for cathode is warmed by the exhaust air gas after heat-exchanged with the hydrogen at the anode side humidifier 25, it is important to warm the supply gas for cathode in much more appropriate manner. Specifically, the temperature of the cooling medium just exiting FC 2 is similar to that within FC, it is advantageous to warm the supply gas for cathode utilizing the hot cooling medium just exiting FC. The reason why the priority of warming hydrogen is second is that hydrogen is less required for humidification in comparison with the air.

As a result, the outlet side is first warm, making it possible to effectively utilize a heat and to enhance the heat efficiency. Also, since the supply gas is warmed before heat radiation, the heat efficiency can be much more enhanced.

While the embodiments of the present invention have been described, the present invention is not restricted thereto, and various modification and variations can be made without departing from the scopes and spirits of the present invention. For example, in the foregoing embodiments, hot water risers are provided on both sides of the humidifier heads, the hot water riser may be provided within the head or within the solid portion of the head.

What is claimed is:

1. A fuel cell system comprising:
   an anode side humidifier for humidifying a fuel gas and a cathode side humidifier for humidifying a reactant gas, wherein each humidifier includes plurality of hollow fiber membrane modules for migrating moisture between a supply gas, which is supplied to a fuel cell, and an exhaust gas, which is exhausted from the fuel cell to thereby humidify the supply gas:
   a pair of heads which hold both ends of said hollow fiber membrane modules,
   a connecting member which connects each of the heads, and
   a device for warming the supply gas composed of conduits through which a cooling medium exhausted from the fuel cell is passed, said device including a first conduit disposed along said connecting member, a second conduit disposed around an outer circumference of one of said pair of heads, and a third conduit disposed around an outer circumference of the other of said pair of heads;
   wherein said device for warming the supply gas is configured to first warm a humidifier at an outlet side of the supply gas, and subsequently warm a humidifier at an inlet side of the supply gas.

2. The fuel cell system according to claim 1, wherein said device for warming the supply gas is configured to first warm the cathode side humidifier at an outlet side of the supply gas.

3. The fuel cell system according to claim 2, wherein said device for warming the supply gas is configured to first warm the cathode side humidifier at an outlet side of the supply gas, and then warm the cathode side humidifier at the inlet side of the supply gas.

4. The fuel cell system according to claim 3, wherein said device for warming the supply gas warms the anode side humidifier at an outlet side of the supply gas after warming the cathode side humidifier at the inlet side of the supply gas.

5. The fuel cell system according to claim 1, wherein said device for warming the supply gas is composed of at least one conduit configured so as to follow said heads.

* * * * *